United States Patent
Carter et al.

(10) Patent No.: US 9,179,649 B2
(45) Date of Patent: Nov. 10, 2015

(54) WILD BIRD FEED DISPENSER WITH SQUIRREL-RESISTANT MECHANISM

(71) Applicant: Classic Brands, LLC, Denver, CO (US)

(72) Inventors: James Carter, Denver, CO (US); Bryan Krueger, Denver, CO (US); Lynn Hunter, Parker, CO (US)

(73) Assignee: CLASSIC BRANDS, LLC, Denver, CO (US)

( * ) Notice: Subject to any disclaimer, the term of this patent is extended or adjusted under 35 U.S.C. 154(b) by 0 days.

(21) Appl. No.: 14/624,375

(22) Filed: Feb. 17, 2015

(65) Prior Publication Data

US 2015/0156993 A1      Jun. 11, 2015

Related U.S. Application Data

(63) Continuation of application No. 13/901,321, filed on May 23, 2013, now Pat. No. 8,978,586.

(60) Provisional application No. 61/650,711, filed on May 23, 2012.

(51) Int. Cl.
*A01K 39/00* (2006.01)
*A01K 39/01* (2006.01)
*A01K 39/012* (2006.01)

(52) U.S. Cl.
CPC ............ *A01K 39/0113* (2013.01); *A01K 39/012* (2013.01)

(58) Field of Classification Search
CPC ........................... A01K 39/0113; A01K 31/12

USPC ............ 119/57.9, 52.2, 52.3, 52.4, 57.8, 429, 119/61.57, 63

See application file for complete search history.

(56) References Cited

U.S. PATENT DOCUMENTS

| | | | | |
|---|---|---|---|---|
| 3,164,130 A * | 1/1965 | Curtis et al. | ................ | 119/57.9 |
| 4,649,865 A * | 3/1987 | Riggi | ............................ | 119/57.9 |
| RE32,970 E * | 7/1989 | Furlani | ....................... | 119/52.3 |
| 5,676,089 A * | 10/1997 | Morganson | ................. | 119/52.3 |
| 5,947,054 A * | 9/1999 | Liethen | ........................ | 119/57.9 |
| 6,253,707 B1 * | 7/2001 | Cote | ........................... | 119/57.9 |
| D451,251 S * | 11/2001 | Chrisco et al. | ............... | D30/124 |
| 6,408,788 B1 * | 6/2002 | Lieb et al. | .................... | 119/52.2 |
| 7,191,731 B2 * | 3/2007 | Cote | ........................... | 119/57.9 |
| 7,347,162 B2 * | 3/2008 | Zieff et al. | ................... | 119/52.3 |
| 7,448,346 B1 * | 11/2008 | Stone et al. | .................. | 119/52.3 |

* cited by examiner

*Primary Examiner* — Yvonne Abbott-Lewis
(74) *Attorney, Agent, or Firm* — Polsinelli, PC

(57) ABSTRACT

Implementations described and claimed herein provide systems and methods for preventing non-birds, such as squirrels, from accessing feed in a bird feeder. In one implementation, a mechanical link couples a first perch and a second perch to the roof assembly. The mechanical link may be configured to move both the first perch relative to the first feed port and the second perch relative to the second feed port upon movement of the first perch relative to the housing and/or upon movement of at least a portion of the roof assembly relative to the housing. As such, the bird feeder provides access to the feed in the bird feeder to wild birds, while preventing non-birds, such as squirrels, from accessing the feed.

31 Claims, 18 Drawing Sheets

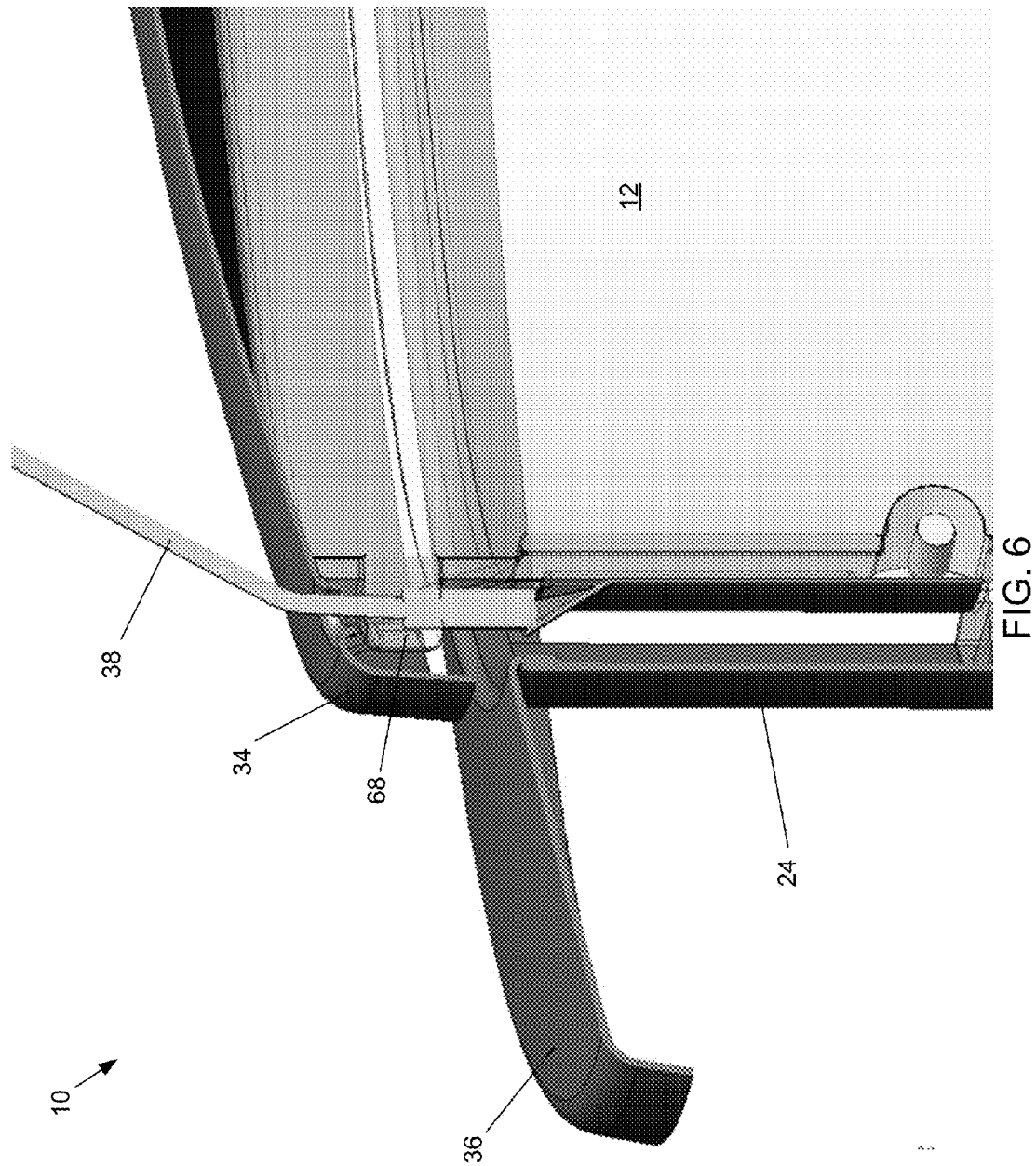

WILD BIRD FEED DISPENSER WITH SQUIRREL-RESISTANT MECHANISM

CROSS-REFERENCE TO RELATED APPLICATIONS

The present application is a continuation of U.S. patent application Ser. No. 13/901,321, entitled "Wild Bird Feed Dispenser with Squirrel-Resistant Mechanism" and filed on May 23, 2013, which claims benefit under 35 U.S.C §119 to U.S. Provisional Patent Application No. 61/650,711, entitled "Wild Bird Feed Dispenser with Squirrel-Resistant Mechanism" and filed on May 23, 2012. Both of these applications are incorporated by reference in their entirety herein.

TECHNICAL FIELD

Aspects of the present disclosure relate to wild bird feed dispensers and in particular to systems and methods for preventing non-birds, such as squirrels, from accessing the feed in the dispenser.

BACKGROUND

Attracting wild birds, particularly song birds, using feed dispensers is an increasingly popular hobby. The ability to attract desired birds may be limited, however, where the area in which the feeder is stationed is frequented by non-bird species, such as squirrels. Many conventional dispensers are susceptible to squirrels accessing and consuming the feed, thereby discouraging wild birds from visiting the dispenser and greatly increasing the costs associated with the hobby by having to replace the consumed feed in shorter intervals. These challenges are exacerbated in attempting to distinguish between wild birds and non-birds, such as squirrels, to ensure that the feed is not denied to the birds.

It is with these observations in mind, among others, that various aspects of the present disclosure were conceived and developed.

SUMMARY

Implementations described and claimed herein address the foregoing problems, among others, by providing systems and methods for preventing non-birds, such as squirrels, from accessing feed in a bird feeder. In one implementation, a bird feeder comprises a housing having a generally vertically extending wall defining a reservoir. The housing includes a first feed port and a second feed port formed through the wall and an upwardly facing opening to the reservoir. A roof assembly removably covers the upwardly facing opening and is mounted for movement relative to the housing. A first perch is adjacent to and mounted for movement relative to the first feed port, and a second perch is adjacent to and mounted for movement relative to a second feed port. A mechanical link couples the first perch and the second perch to the roof assembly. The mechanical link is configured to move both the first perch relative to the first feed port and the second perch relative to the second feed port upon movement of the first perch relative to the housing.

In another implementation, a housing has a generally vertically extending wall defining a reservoir. The housing includes a first feed port and a second feed port formed through the wall and an upwardly facing opening to the reservoir. A roof assembly removably covers the upwardly facing opening and is mounted for movement relative to the housing. A first perch is adjacent to and mounted for movement relative to the first feed port, and a second perch is adjacent to and mounted for movement relative to a second feed port. A mechanical link couples the first perch and the second perch to the roof assembly. The mechanical link is configured to move at least one of the first perch relative to the first feed port or the second perch relative to the second feed port upon movement of at least a portion of the roof assembly relative to the housing.

In still another implementation, a housing has a wall defining a reservoir and an opening to the reservoir. The wall has a feed port, and a perch is disposed adjacent to the feed port. A roof assembly has a lid portion configured to removably cover the opening and a moveable portion. An actuator extends from the perch to the moveable portion of the roof assembly along the wall. The actuator has an aperture and is configured to move between a first position and a second position relative to the housing. The first position includes an alignment of the aperture with the feed port, and the second position includes the actuator occluding the feed port.

In yet another implementation, a housing has a wall defining a reservoir and an opening to the reservoir. The wall has a feed port, and a perch is disposed adjacent to the feed port. A roof assembly has a lid configured to removably cover the opening. An actuator extends from the perch to the roof assembly, and a port shutter is connected to the actuator. The port shutter is configured to move between a first position and a second position relative to the feed port. The first position includes the port shutter spaced from the feed port providing access to the reservoir through the feed port, and the second position includes the port shutter occluding the feed port.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 6 is a close-up partial sectional view through an upper portion of the bird feeder of FIG. 1 showing the roof assembly, the hanger and the housing.

DETAILED DESCRIPTION

Aspects of the present disclosure relate to systems and methods for preventing non-birds, such as squirrels, from accessing feed in a bird feeder. Generally, a bird feed dispenser for wild birds includes a squirrel-resistant mechanism that occludes feed ports when a non-bird having a weight sufficient to activate the mechanism engages a portion of the roof or a perch thereon. The dispenser includes at least two feed ports, corresponding perches, and a torsion spring that provide biasing force for the mechanism. The occlusion of feed ports in the dispenser is such that when a non-bird having weight sufficient to activate the mechanism engages a portion of the roof or a perch thereon, all the feed ports are obstructed.

In one aspect, a bird feeder includes a housing having a generally vertically extending wall defining a reservoir. The housing includes a first feed port and a second feed port formed through the wall and an upwardly facing opening to the reservoir. A roof assembly removably covers the upwardly facing opening and is mounted for movement relative to the housing. A first perch is adjacent to and mounted for movement relative to the first feed port, and a second perch is adjacent to and mounted for movement relative to a second feed port. A mechanical link couples the first perch and the second perch to the roof assembly. The mechanical link may be configured to move both the first perch relative to the first feed port and the second perch relative to the second feed port upon movement of the first perch relative to the housing. The mechanical link may further be configured to move at least one of the first perch relative to the first feed port or the second perch relative to the second feed port upon movement of at least a portion of the roof assembly relative to the housing. As such, the bird feeder provides access to the feed in the bird feeder to wild birds, while preventing non-birds, such as squirrels, from accessing the feed.

Figure 1:
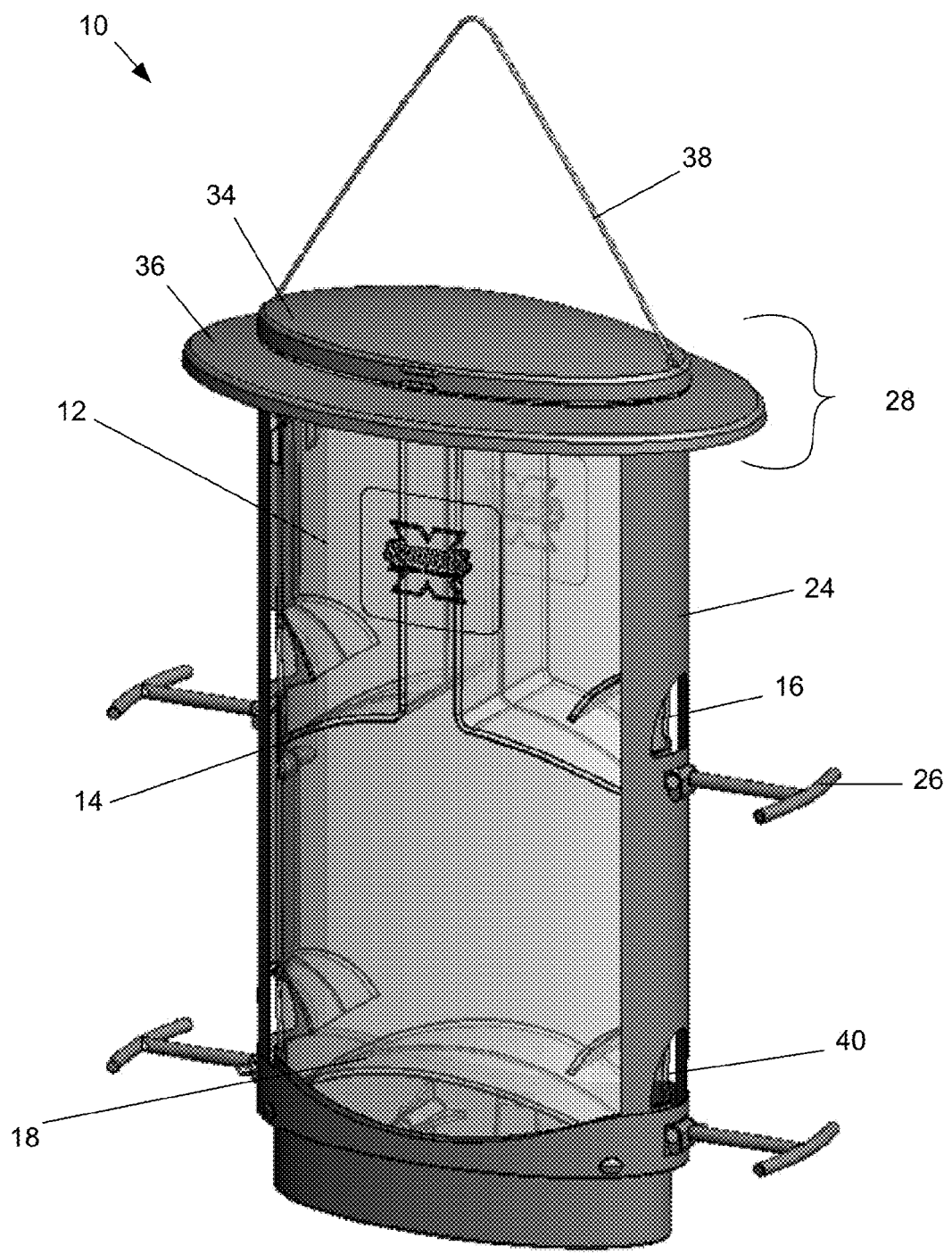
FIG. 1 illustrates a perspective view of an example bird feeder having a squirrel resistant mechanism.
Figure 2:
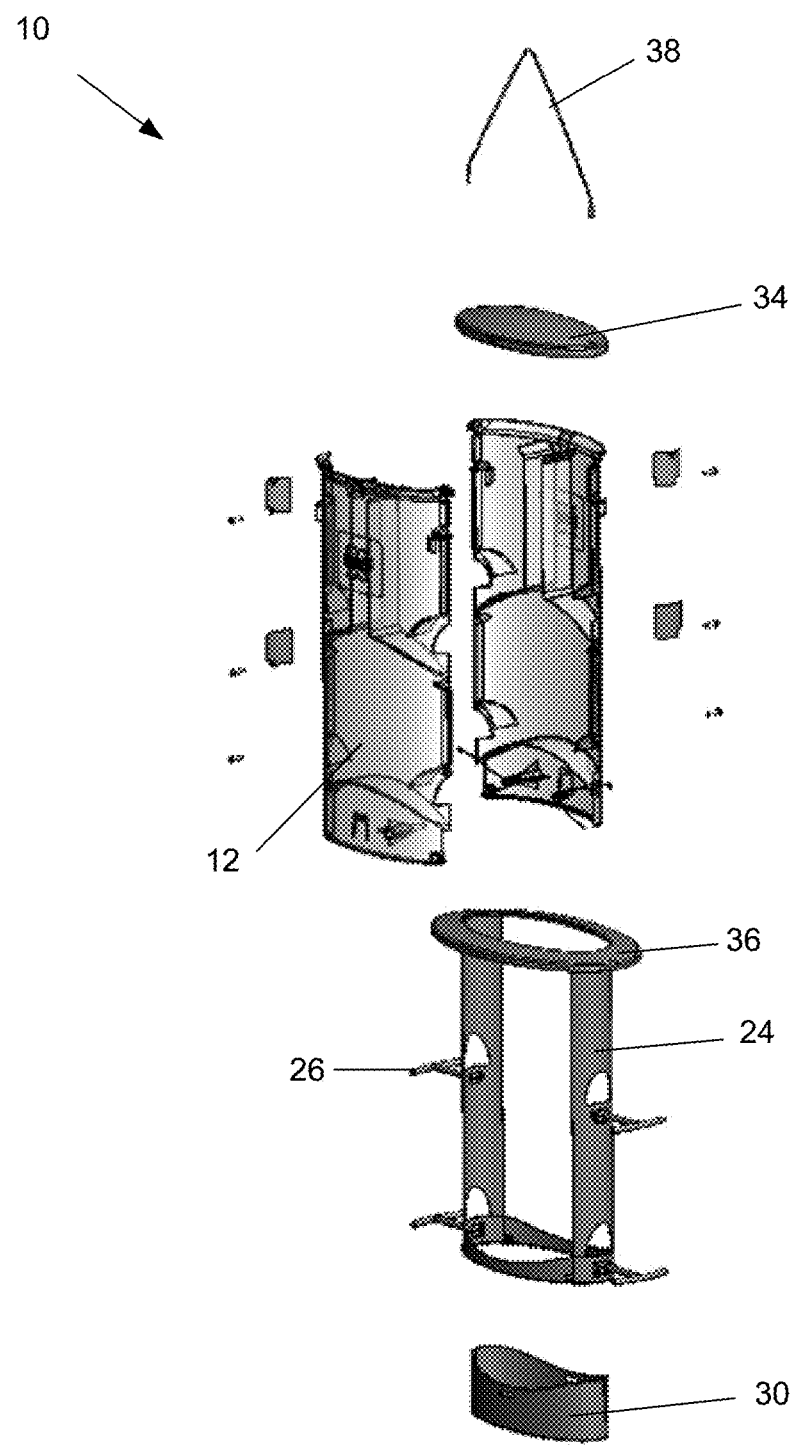
FIG. 2 is an exploded view of the bird feeder of FIG. 1.
Figure 4:
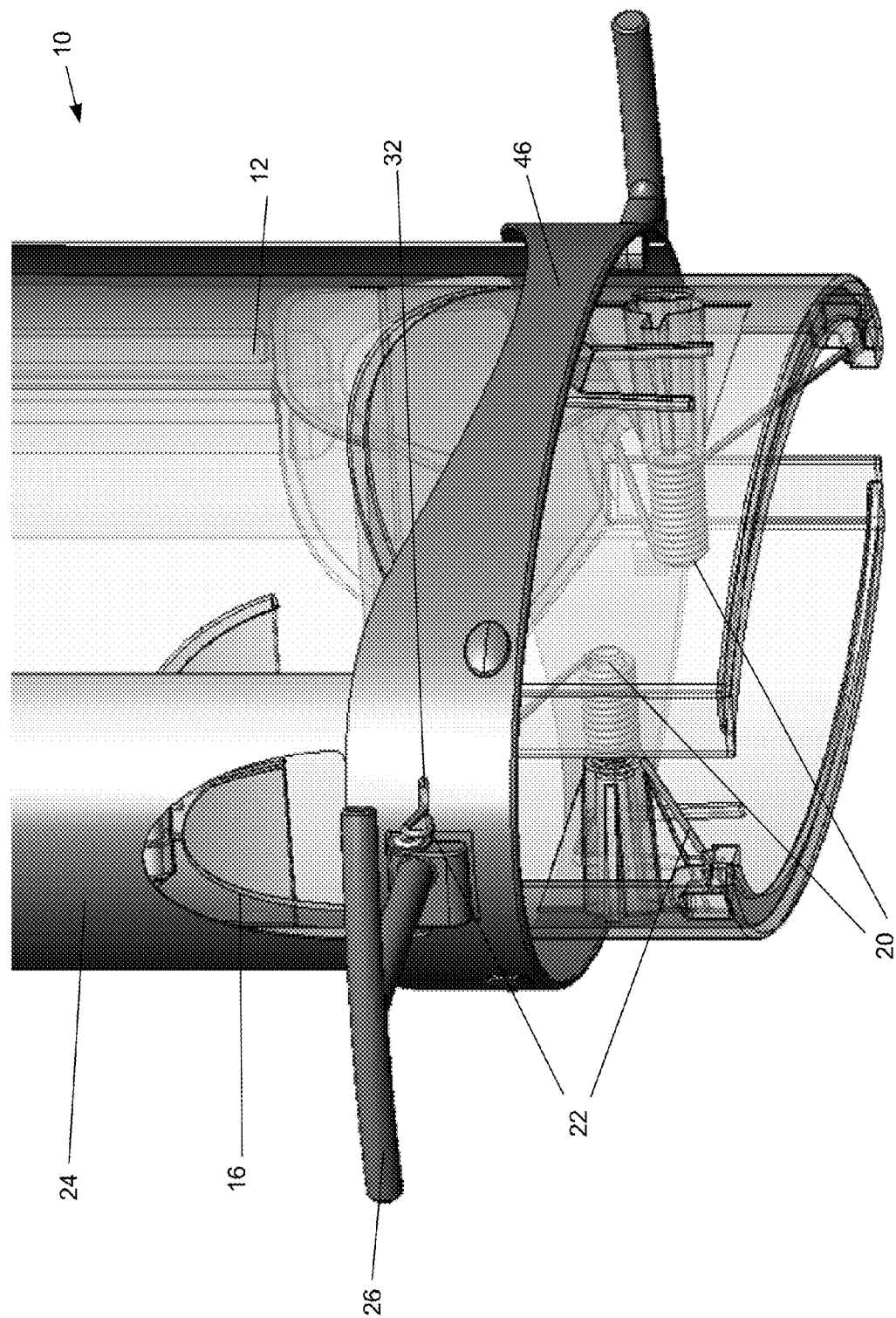
FIG. 4 is a view similar to FIG. 3 with a base portion removed to show torsion springs.

To begin a detailed description of an example bird feeder having a squirrel resistant mechanism, reference is made to the various Figures. In one implementation, the birdfeeder assembly 10 comprises two generally vertically symmetrical housing halves of injection molded polymer, which may be, for example, transparent or translucent. These two housing halves may be held together by glue or screws or may be assembled using clips and hinging mechanisms so that the housing 12 can be easily cleaned after being used to feed birds. In one implementation, the housing 12 includes internal baffles 14 to help distribute the seed that is poured into the top upwardly facing opening towards various feed ports 16. The feed ports 16 are thus molded-in passages through the housing 12 wall from the outside of the housing 10 to the interior where the bird seed is held within the housing 12 reservoir. Referring to the implementation of FIG. 1, the housing 12 includes four feed ports 16, two on each diametrically opposite side. Each pair of feed ports 16 is arranged one vertically above the other. The bottom of the feed reservoir is defined by a pair of generally curving walls 18 that engage along adjacent edges or surfaces to define a generally solid bottom which slopes to the bottom-most pair of feed ports 16. As seen in FIG. 4, below this bottom surface the housing 12 walls continue and support and define a pair of studs 20 about which a pair of torsion springs 22 are mounted. As will be detailed, these torsion springs 22 engage a pair of actuators 24 or linkages which mechanically interconnect all of the perches 26 as well as at least a portion of the roof assembly 28.

Figure 3:
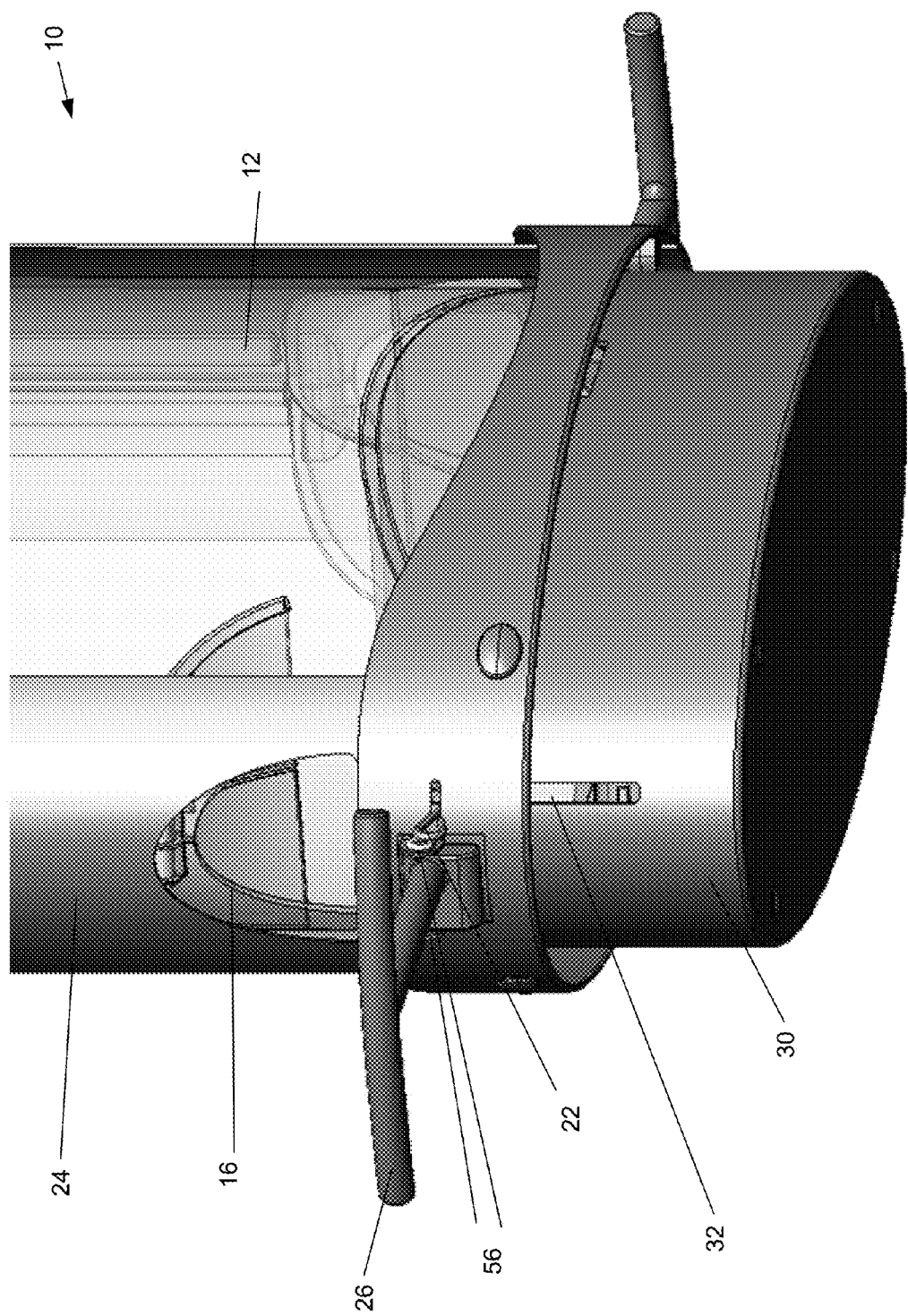
FIG. 3 is a partial close-up view of a moveable perch and an adjacent feed port.
Figure 5:
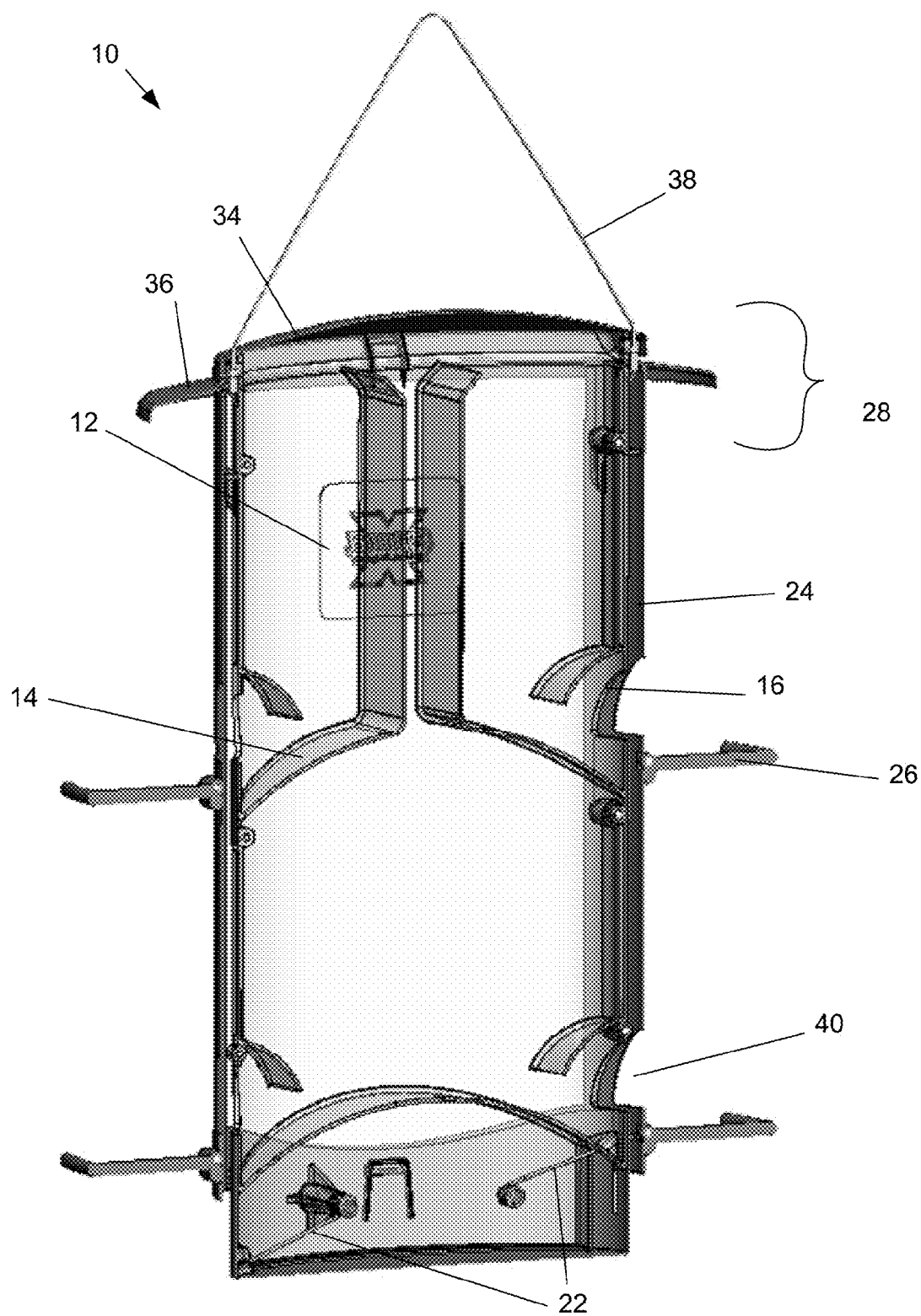
FIG. 5 is a vertical cross-section through the center of the bird feeder of FIG. 1.

Referring to FIG. 3, a base 30, which may be of a stamped thin metal similar to the roof assembly 28 and actuator 24 portions as will be detailed, engages and surrounds this lower portion of the housing 12. As stated previously, this implementation has four feeding ports 16. Accordingly, this implementation includes a perch 26 adjacent to each of the feeding ports 16. In one implementation, the perch 26 comprises a T-shaped metal protrusion attached to a sheet metal actuator 24 by a pair of lugs 56. This construction permits the perch 26 to hinge upwardly and fit snugly against the and parallel to the housing 10 for easy compact shipping. More importantly, however, each perch 26 is affixed to the actuator 24 which as will be detailed, is in turn mounted for movement relative to the housing 12. Referring again to FIG. 4, a torsion spring 22 as mentioned previously is mounted at one end to the housing 12 and around an integrally formed stud 20 within the bottom portion of the housing 12. As seen in FIGS. 4 and 5, the distal movable end of the torsion spring 22 may engage the lower-most end of the actuator 24. In this implementation the torsion spring 22 passes through a slot 32 in the base 30 and serves to help guide the generally vertical movement of the perches 26 and actuators 24 (and at least a portion of the roof assembly 28 as will be detailed.)

Referring to FIG. 6, the upper-most end of the actuator 24 is affixed, for example, by welding, to a portion of the roof assembly 28. In more detail, the roof assembly 28 comprises a lid portion 34 which is removably attached to and covers the upwardly facing opening into the feed reservoir of the housing 12. This portion is separate from but cooperates with a movable, radially-extending outward portion 36 of the roof assembly 28 which is affixed to the upper end of the actuators 24. These two portions of the roof assembly 28 (i.e., lid portion 34 and the movable portion 36) act to close the opening used to fill the seed reservoir and to help shield the feed reservoir and the feed ports 16 from precipitation. The second or movable portion 36 of the roof assembly 28 protrudes radially outwardly beyond the vertical wall of the housing 12 and, as previously discussed, is affixed to the upper end of the actuator 24.

Referring to various figures, a hanger 38, for example, comprising a flexible steel cable of about a $\frac{1}{16}^{th}$ inch diameter is affixed at each of its ends to a molded in plastic lug 68 at the upper-most edge of the housing 12.

The movable portion 36 of the roof assembly 28 is attached to and moves with the actuator 24 and thus moves against or with the bias of the torsion springs 22 as previously described. Note that the actuator 24 includes an aperture 40 which, in one position of the spring biased perch 26 is aligned with the feed port 16 through the housing 12 wall. If a non-bird species, such as a squirrel, attempts to access the birdseed in the feed when the feeder is hanging from the hanger 38, usually this requires the squirrel to grip either the roof 28 or one or more of the perches 26, since the housing 12 has almost no features which can be gripped by the squirrel. The weight of this non-bird species overpowers the spring bias of the torsion springs 22, causing the movable portion 36 of the roof assembly 28 and the actuator 24 and its attached perches 26 to move downwardly. This downward displacement moves the apertures 40 in the actuators 24 out of alignment with the feed ports 16, thus occluding or obscuring access to the feed ports 16.

Further referring to FIGS. 3 and 4, the movable end of the biasing spring 22 is loosely attached to the actuator 24 and slides in a slot 32 through a peripheral band 42 that extends and connects the lower-most end of each actuator 24 with its opposing actuators 24. The peripheral band 42 helps guide the actuator 24 in a substantially only vertical direction up and down so that the aperture 40 through the actuator 24 normally aligns laterally as well as vertically with the feed port 16 when a bird is sitting on the perch 26 or at least when any non-bird species such as a squirrel has not deflected the actuator 24 downwardly against the bias of the torsion spring 22.

In a similar manner, each actuator 24 is attached at diametrically opposite locations to the movable portion 36 of the roof assembly 28. In this way a non-bird species, such as a squirrel may attempt to access the birdseed by climbing down the hanger 38 and gripping the roof 28 portion at any location. Regardless of that location, all of the feed ports 16 become closed or occluded when the actuator 24 assembly slides downwardly, guided by and against the bias of one or more torsion springs 22.

In one implementation, the overall assembly 10 includes two torsion springs 22, each mounted symmetrically opposite from one another and engaging the bottom-most edge of the adjacent actuator 24 on opposite sides of the housing 12, as seen in FIGS. 4 and 5.

Figure 7A:
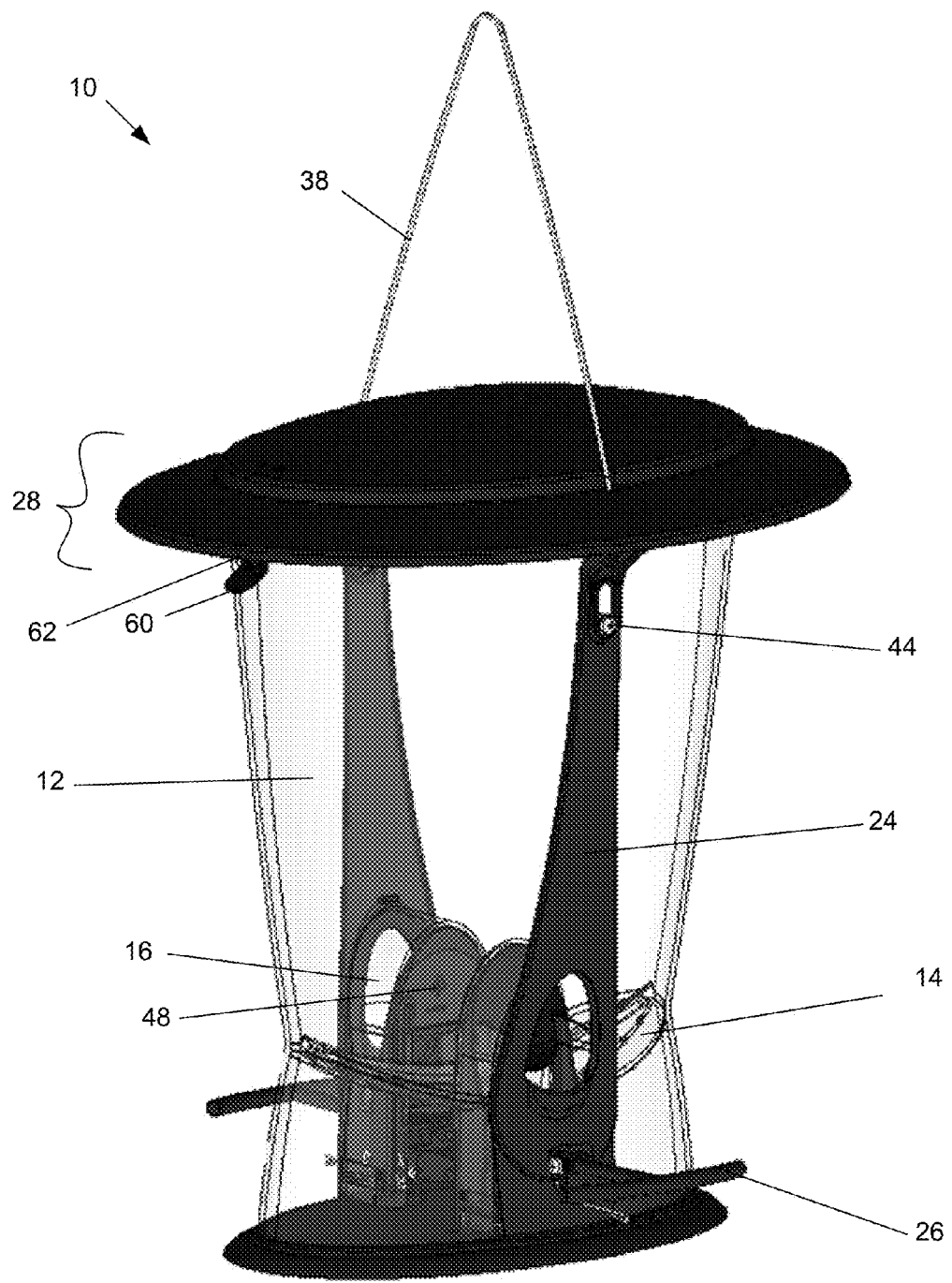
FIG. 7A is perspective view of another example bird feeder having a squirrel resistant mechanism.
Figure 7B:
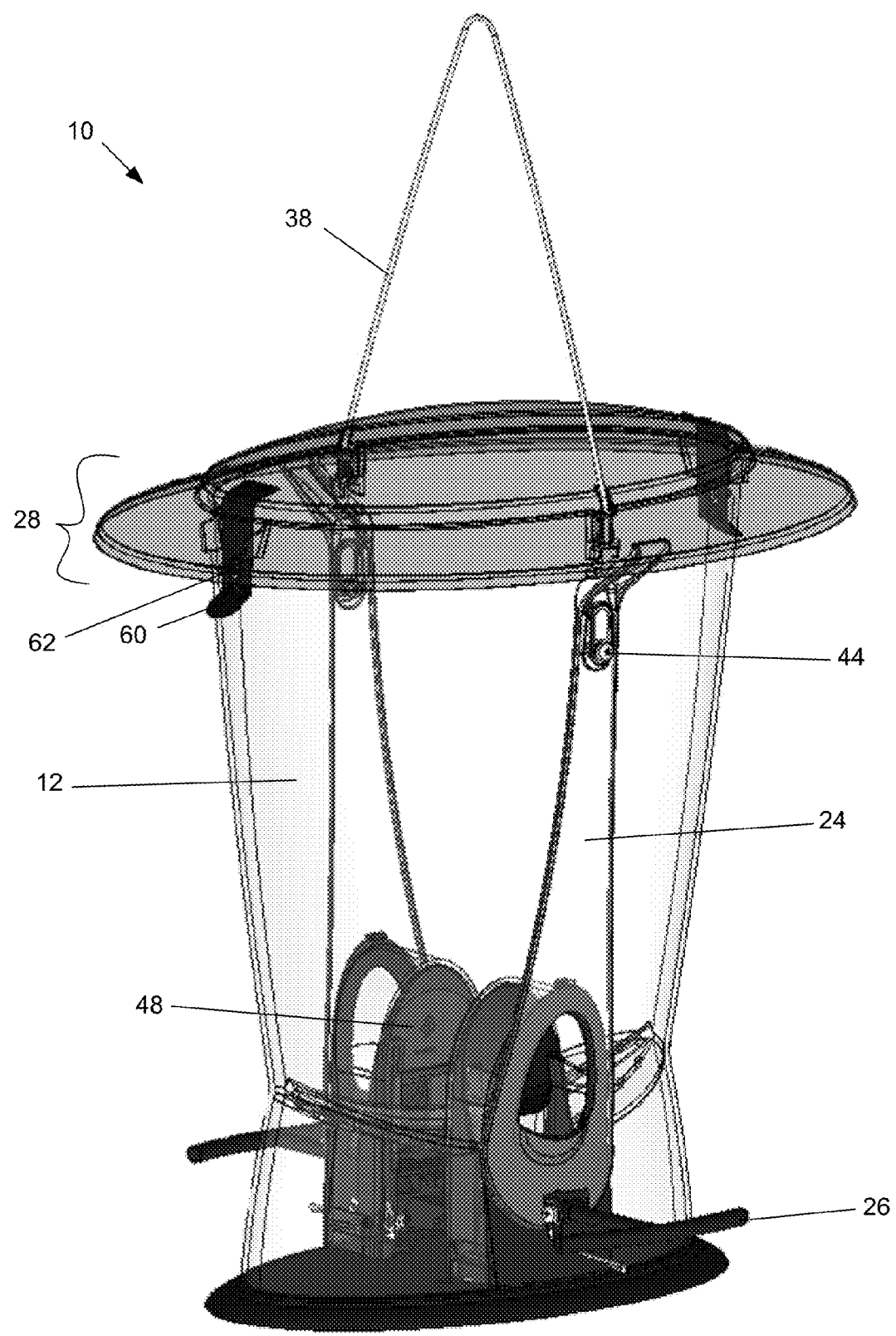
FIG. 7B shows the bird feeder of FIG. 7A with the roof assembly and actuators depicted transparently.
Figure 8:
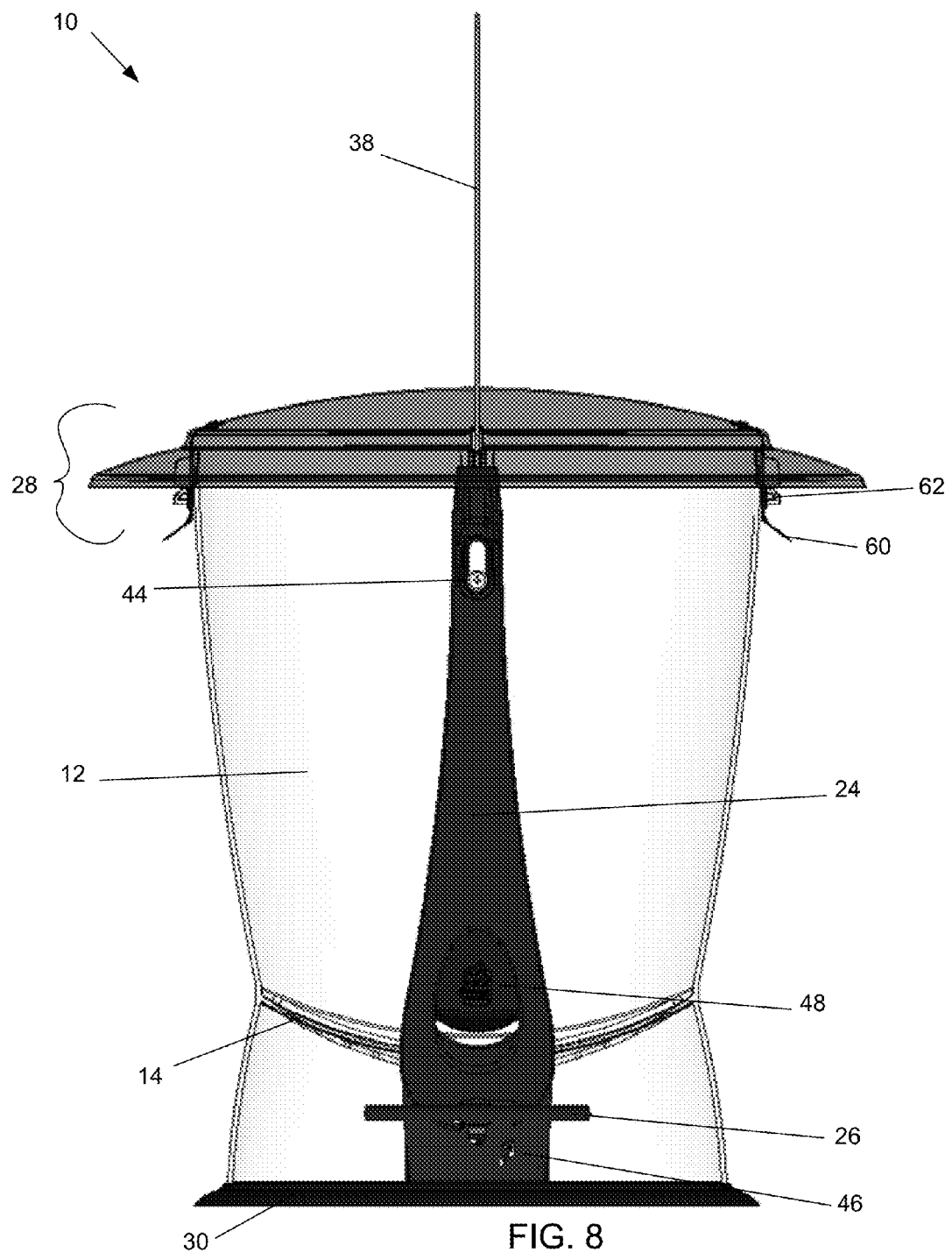
FIG. 8 is a plan view of the bird feeder of FIG. 7A with a transparent roof assembly.
Figure 9:
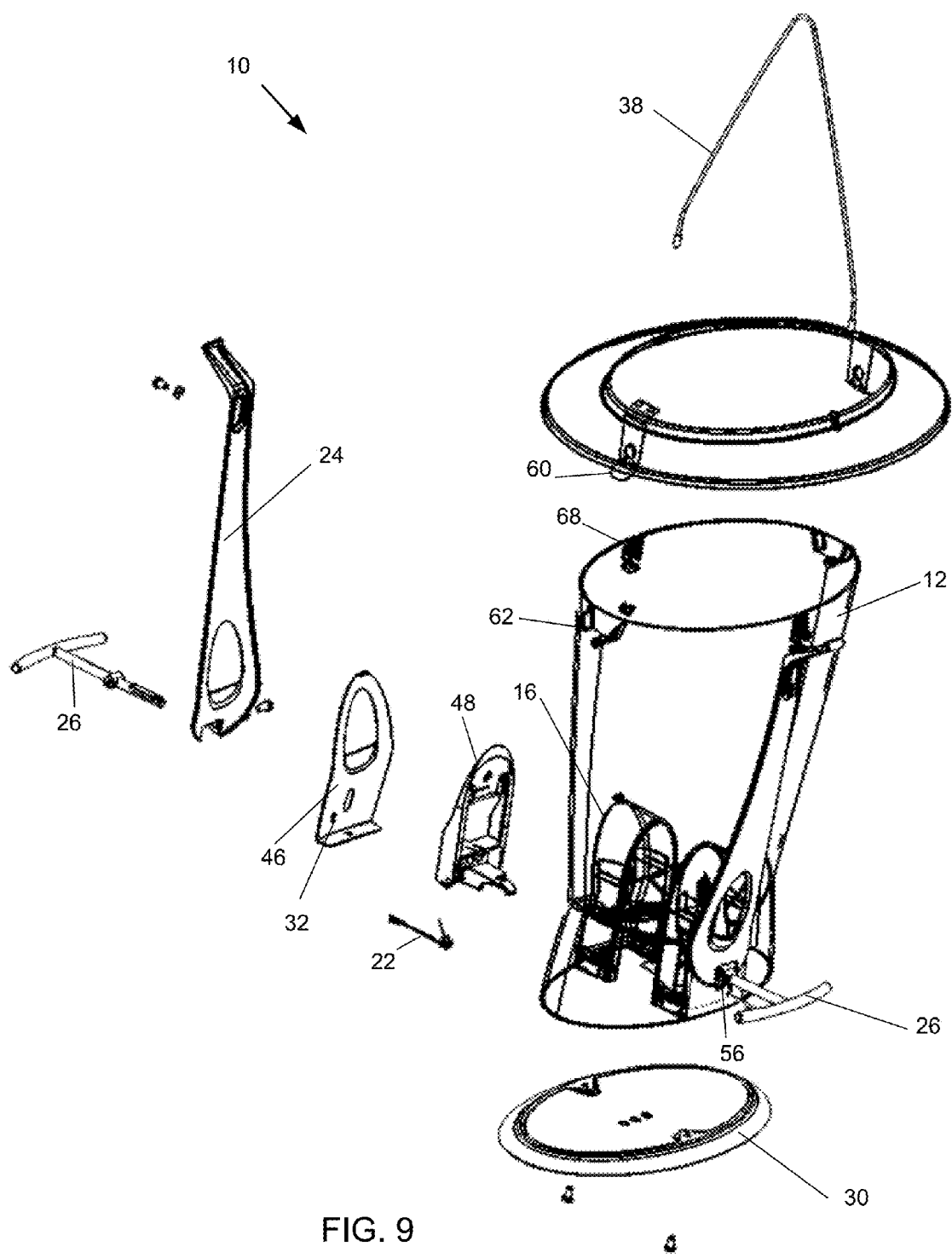
FIG. 9 is an exploded view of the bird feeder of FIG. 7A.
Figure 10:
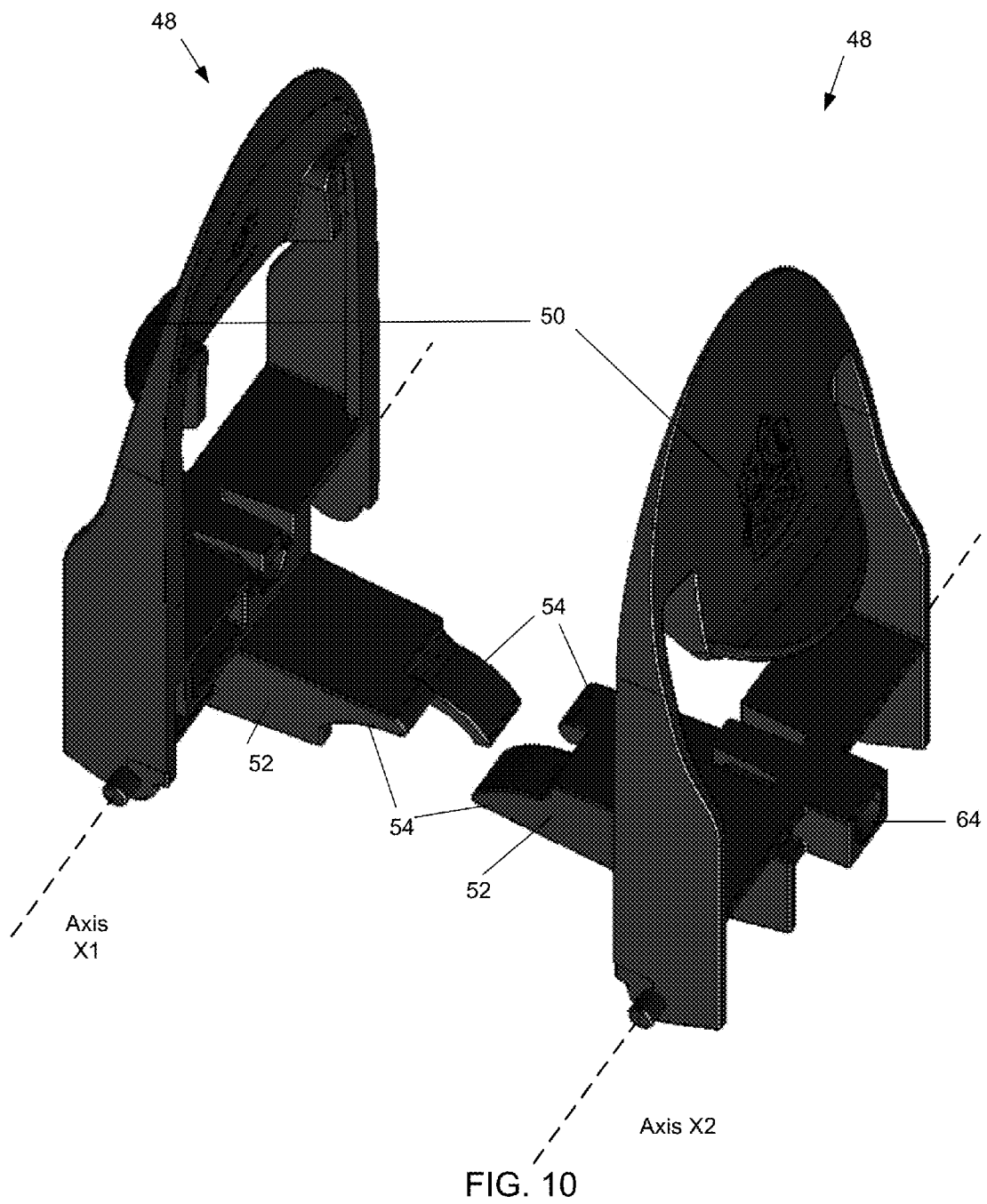
FIG. 10 shows a pair of port shutters with inter-engagable linkages separated for clarity.
Figure 11:
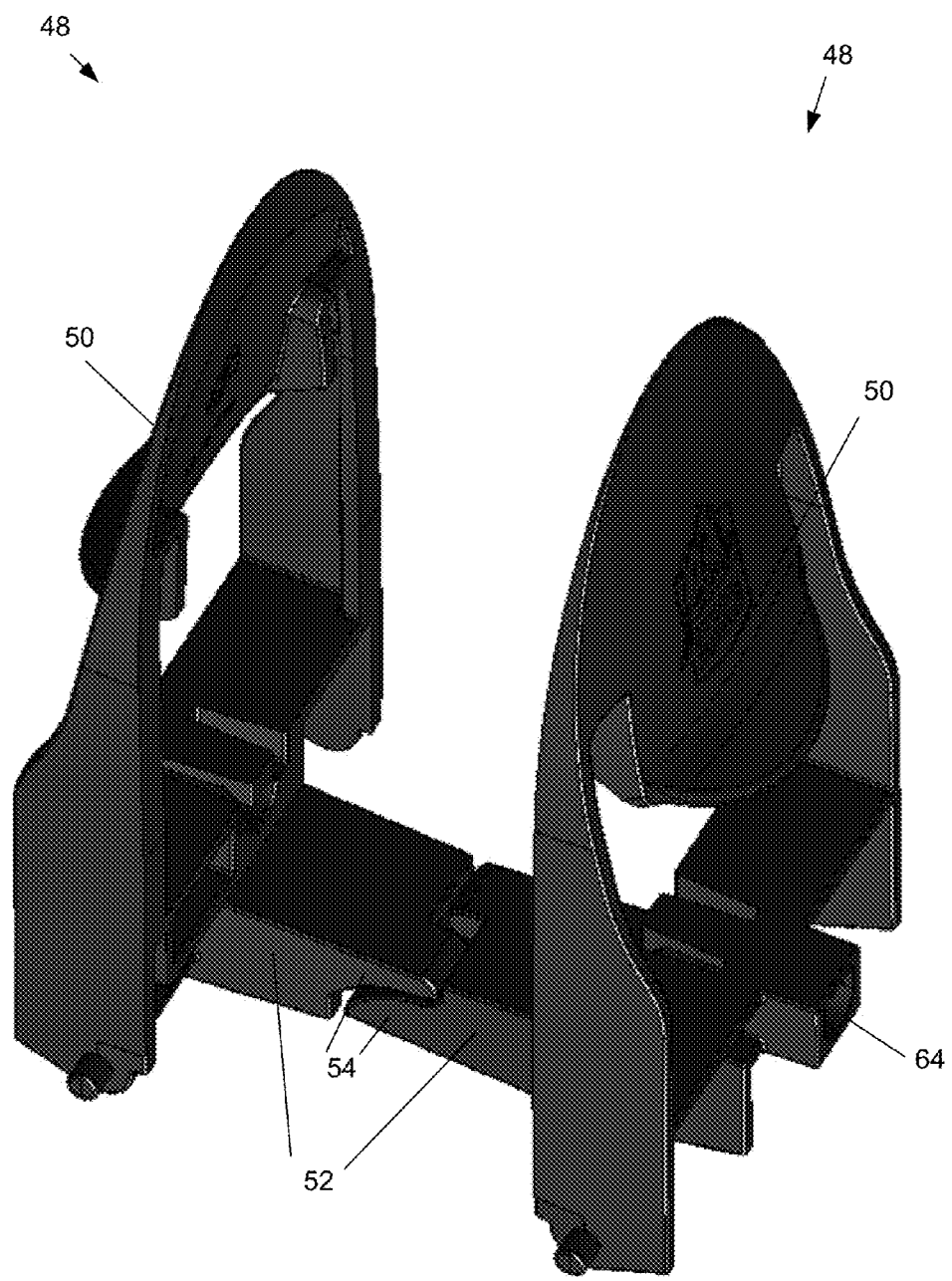
FIG. 11 shows a pair of port shutters with linkages interengaged.
Figure 12:
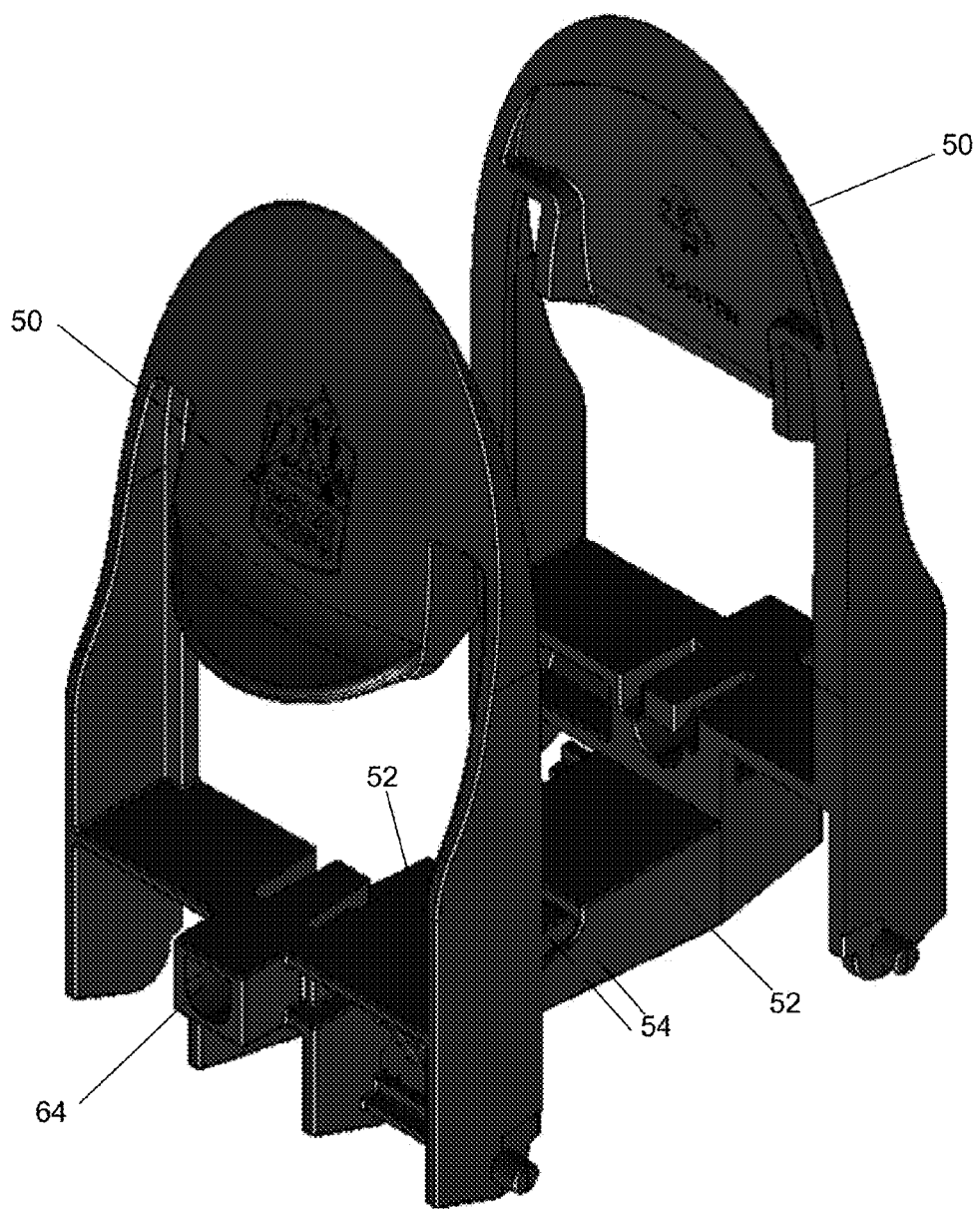
FIG. 12 is another view of the port shutters of FIG. 11.

Referring to FIGS. 7A and 7B, as well as subsequent figures, this implementation also uses a pair of actuators 24 or linkages, but these actuators 24 normally bear upwardly on the downwardly-facing surface of a one-piece roof assembly 28. Each actuator 24 is mounted and guided by a screw 44 attached to a stud in the side of the housing 12 wall. The actuator 24 is capable of displacing a sliding distance 74, relative to the screw 44 location. The lower-most end of each actuator 24 includes a lug 56 to which is pivotally mounted a moveable perch 26 as previously described, the actuator 24 also has an aperture 40 which when the assembly is not being attached by a non-bird species aligns with and permits access to a feeding port 16 through the side of the housing 12. A torsion spring 22 mounted within the base 30 portion of the housing 12 engages the housing 12 in a mounting plate 46 at one end and the moveable end engages an inner surface of one of a pair of port shutters 48. The pair of port shutters 48 is shown separately in FIGS. 10-12. These consist of an upper broad portion 50 sized to occlude access through the feeding port 16 when moved towards the port 16 from the inside. Each of these shutters swing from a position spaced from the seed port 16 to a position adjacent to and against the inner surface of the feed port 16 when a non-bird species hangs from or engages the roof assembly 28 or any one of the perches 26 as will be detailed.

Figure 13:
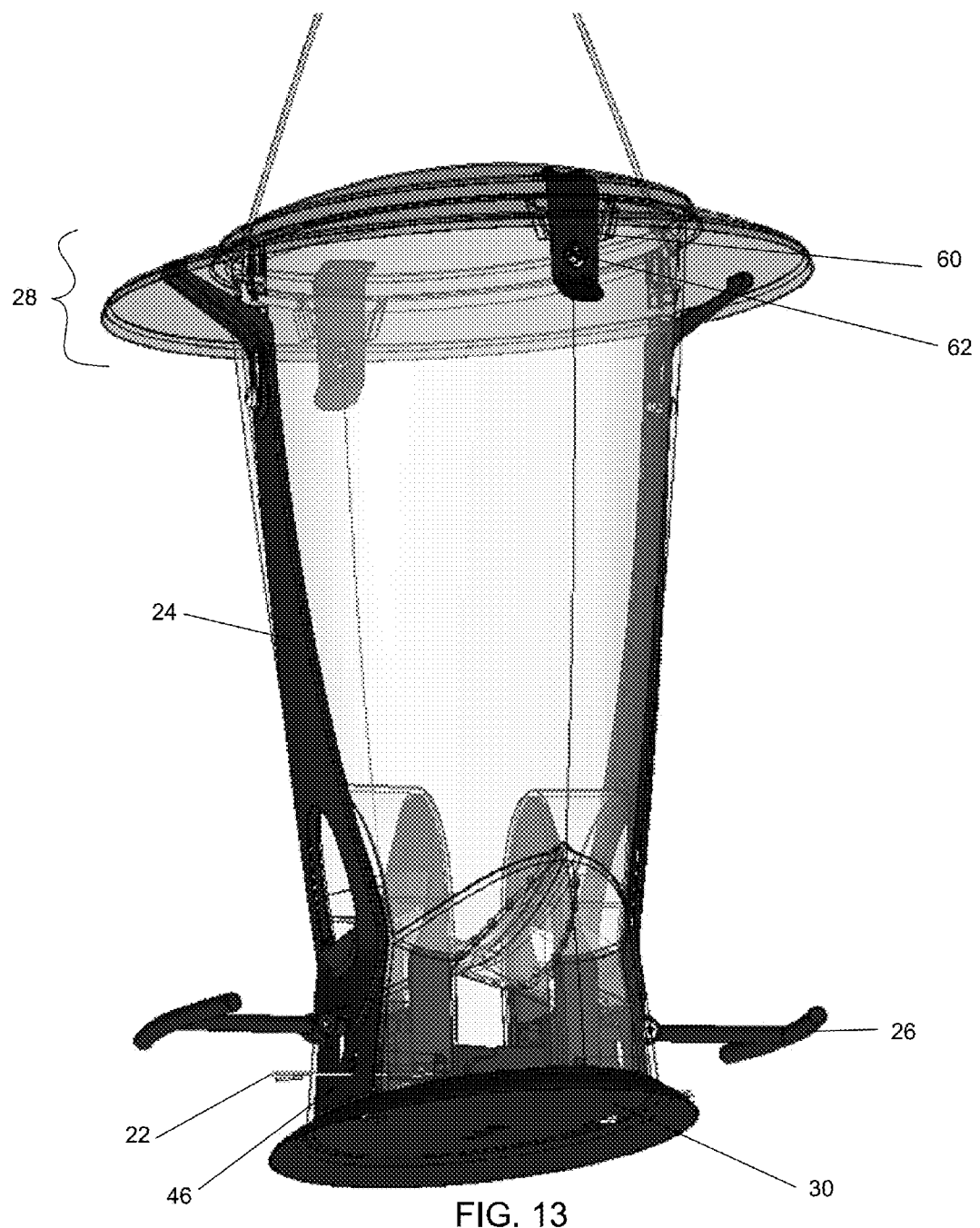
FIG. 13 shows a mechanical link extending from the perch to engage the underside of the roof assembly.
Figure 14:
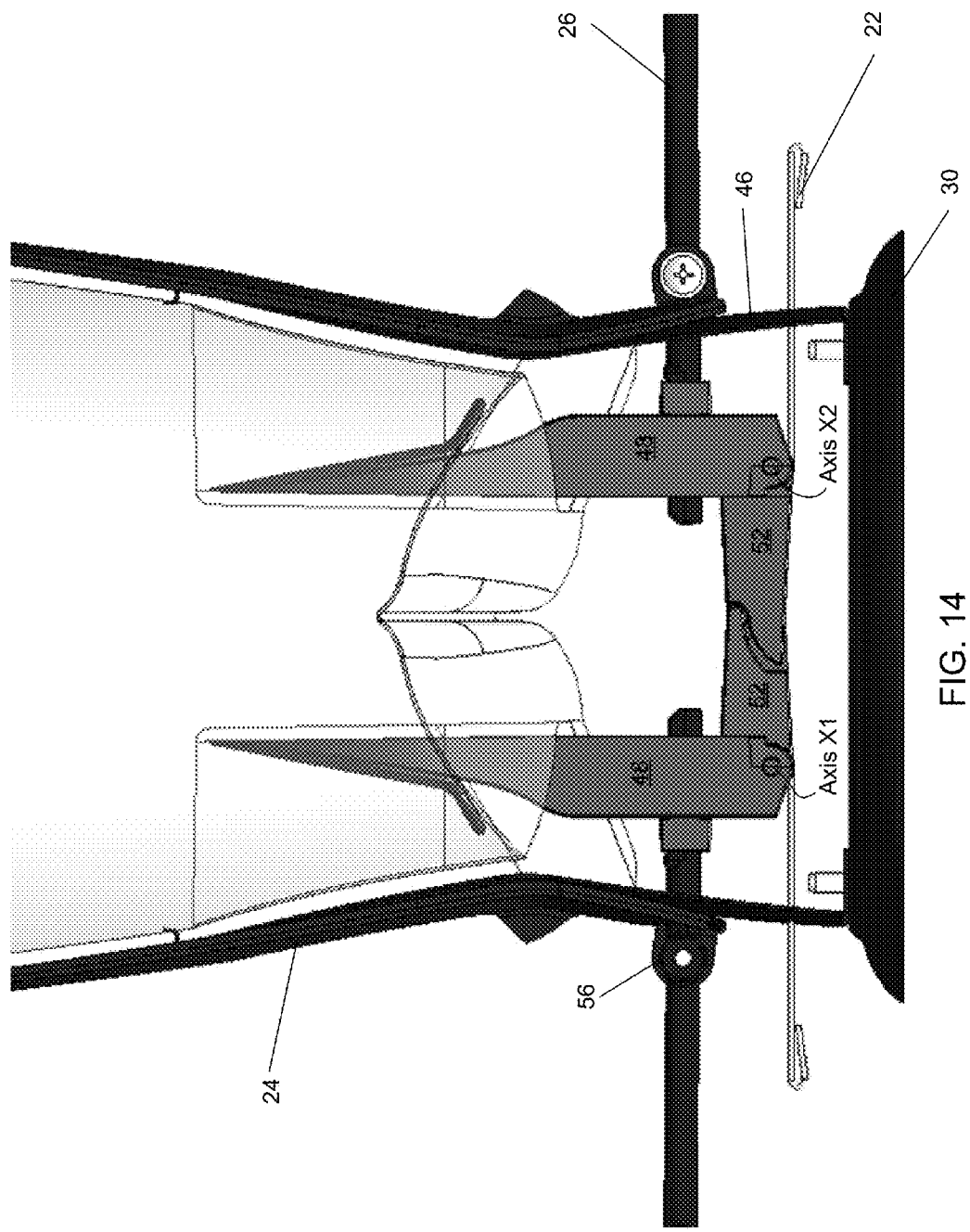
FIG. 14 is a partial cross-sectional view of a pair of movable perch assemblies.
Figure 16:
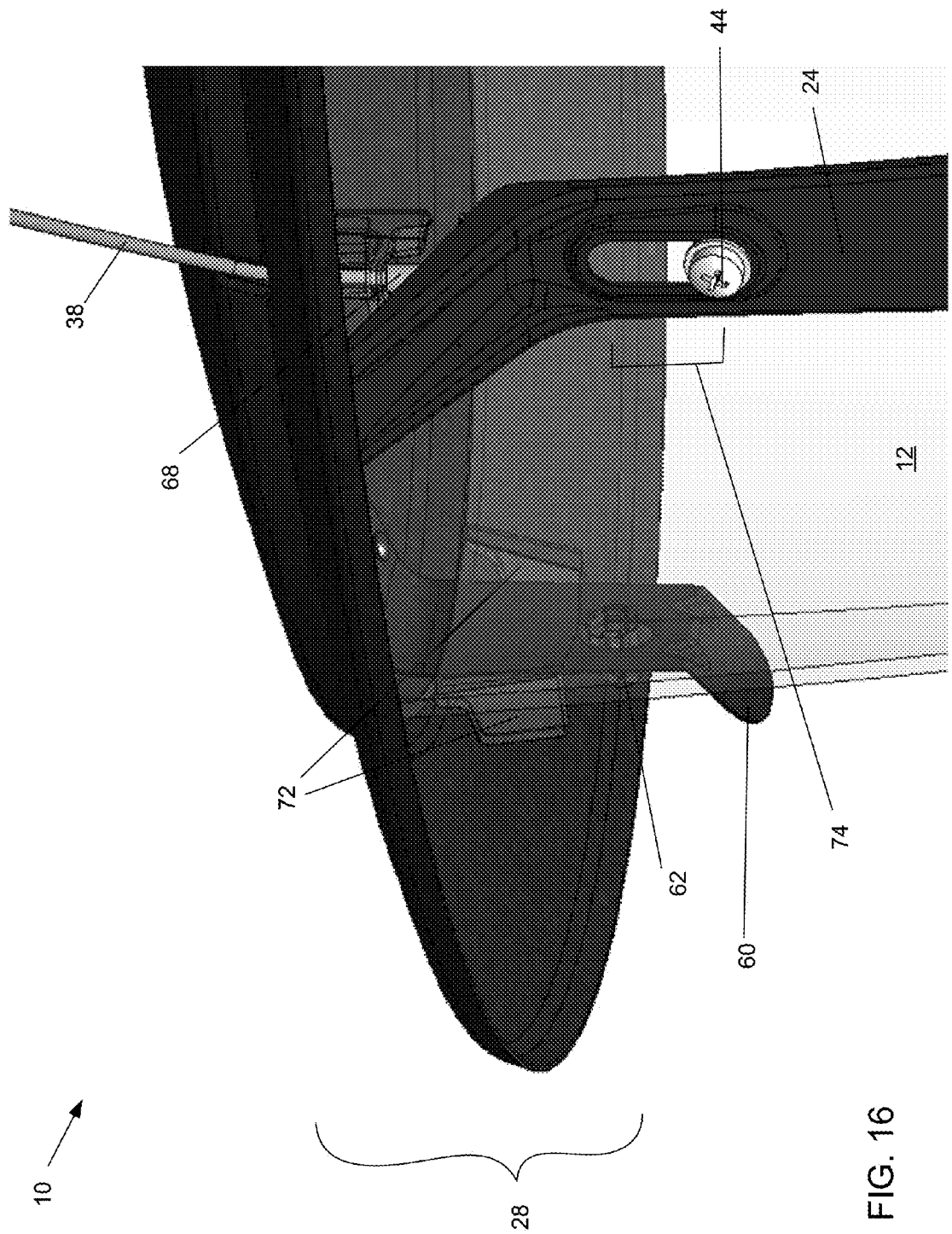
FIG. 16 is a close up of a mechanical link between the perch and the underside of the roof, as well as a latch and latch stud.

FIG. 14 shows a pair of perches 26 assembled to and engaging a pair of port shutters 48. Note that each of these paired perches 26 and shutters 48 pivot about axis x1 and x2 respectively. Each of the shutters 48 includes an extension arm 52 with a pair inter-engaging camming surfaces 54 such that if one of the shutters 48 moves towards the feed port 16 to occlude that feed port 16, the other shutter 48 will also move in this similar pivotal manner about its associated pivoting axis. The movement of the perch 26 is transmitted to the roof 28 or the movement of the roof 28 is transmitted to the perches 26 and thus the port shutters 48 via a lug and screw interconnections 56 as shown in FIGS. 13, 14, and 16, among others.

Figure 15:
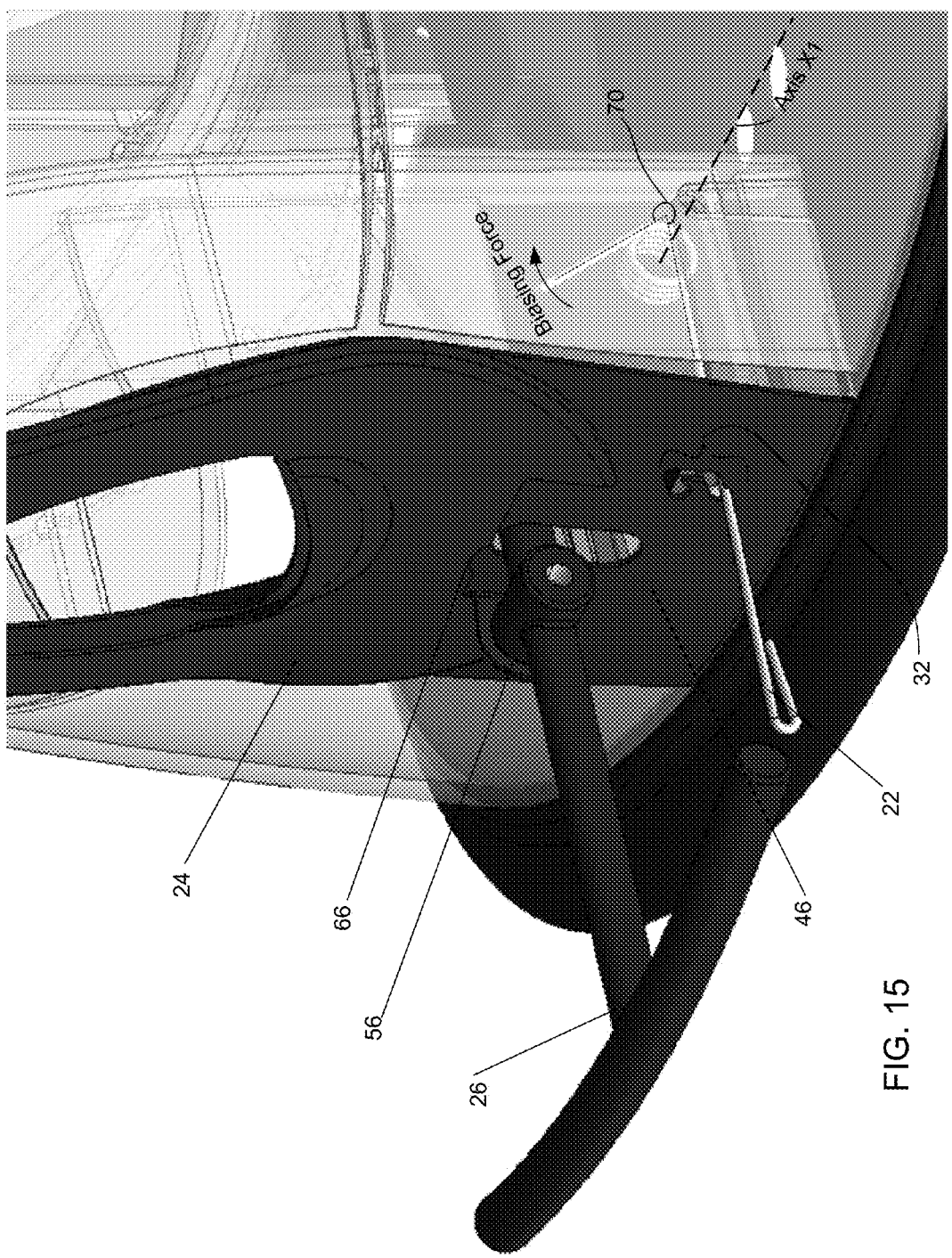
FIG. 15 shows the bird feeder of FIG. 7A with a hidden port shutter in order to view a torsion spring adjustably engaging the housing.

FIG. 15 generally shows a close-up of the lower portion of the assembly 10 with the port shutter 48 hidden in order to view the torsion spring 22. The spring bias provided by the pair of torsion springs 22 can be adjusted by moving the otherwise fixed end of the torsion spring 22 into one of two or many slots 32 formed in the bottom portion of the port shield 58 which is attached in turn to the adjacent portion of the housing 12 wall. The slots 32 in the mounting plate 46 are shown such that placement of the torsion spring 22 in differing slots 32 either increases or decreases the biasing force associated with the spring 22. The change in biasing force results in different forces necessary to displace the perch 26 and thus occlude the feed in the port 16. The reason for the variable bias force is that a change in displacement angle 70 between the moving end of the torsion spring (i.e., the end that is housed in the port shutter 48) and the static end (i.e., the end that is in the slot 32) causes a change in the force necessary to oppose such a force. In such a way, a smaller displacement angle 70 between ends of the torsion spring 22 equates to a higher biasing force necessary to displace the perch 26. As an example, to increase the force necessary to displace the perch 26 (i.e., to allow for heavier birds to feed), the torsion spring 22 is placed in a slot 32 that increases the bias force. In this example, the bias force will be the largest in the highest or topmost slot 32. On the other hand, in order to minimize the force necessary to displace the perch 26, the torsion spring 22 is placed in a slot 32 that decreases the bias force. In this example, the bias force will be the least in the lowest slot 32.

Although the implementation of FIG. 7A includes two slots 32 for altering the biasing force associated with lowering the perch 26 and thus occluding access to the feed, the assembly 10 can includes any suitable number of slots 32. As an example, the implementation of FIG. 1 and/or FIG. 7A may include three or four slots 32 for the altering of the biasing force. Whereas the implementation of FIG. 1 includes a single slot 32, it is contemplated that such an implementation may include additional slots 32, as similarly depicted with respect to the implementation in FIG. 7A.

FIG. 15 further illustrates the interaction between the actuator 24, the mounting plate 46, and the perch 26. The actuator 24 couples to the perch 26 at a lug and screw 56 as described previously. As a force is applied to either a portion of the roof assembly 28 or to the perch 26, the actuator 24 displaces downwardly relative to the mounting plate 46. The low end of the actuator 24 also includes a notch 66 that accommodates certain movements from the perch 26 when the actuator 24 is in a downward displacement.

Referring to FIG. 16, the roof 28 is attached to the housing 12 by a latch 60 and a latch stud 62. In addition, the screw 44 and stud are visible, wherein a downward force on the roof assembly 28 will engage with a top end of the actuator 24 and cause the actuator to displace downwardly relative to the screw 44 and stud, which is coupled to the housing 12. It is evident from this illustration that the amount of downward displacement of the actuator is determined by the allowable sliding distance 74 of the actuator 24 relative to the screw 44.

The roof assembly 28 toggles or rotates about the latch stud 62, as seen in FIG. 16. The rotation or toggling of the roof 28 is guided or otherwise restrained by guides 72 on either side of the latch 60. The amount of rotation of the roof 28 effects the downward displacement of the roof 28. The displacement of the roof can be controlled by appropriate placement of the guides 72 relative to the latch 60 and latch stud 62. In such a way, the position and angle of the guides 72 will correlate to the sliding distance 74 of the screw 44 so that the downward displacement of the roof 28 generally corresponds with the downward displacement of the actuator 24.

Referring to FIG. 16, the hanger 38 extends through an aperture in the roof 28 and is affixed at each of its ends to a molded plastic lug 68 at the upper most edge of the housing 12, as described previously.

Figure 17:
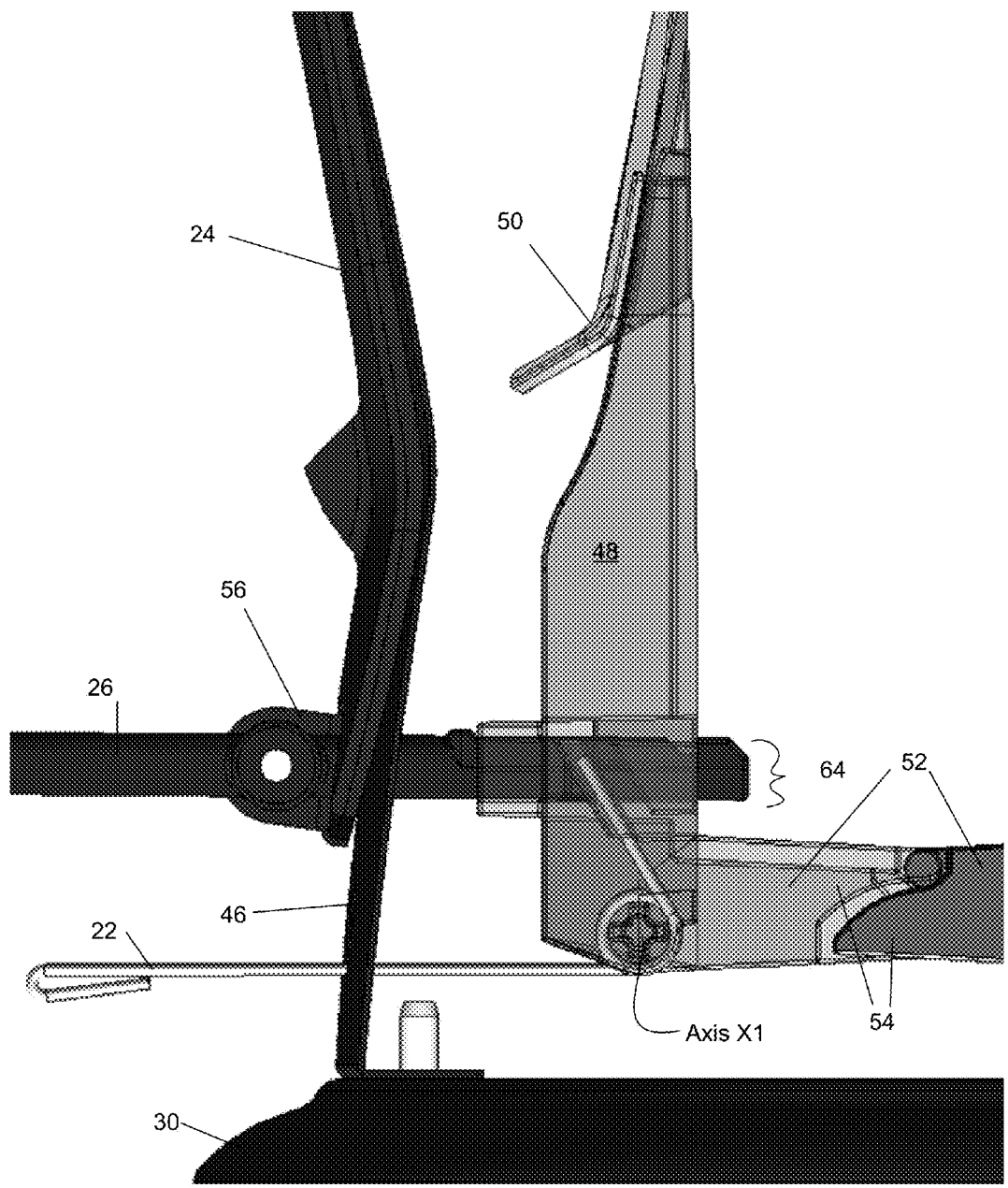
FIG. 17 is a side view of the bird feeder of FIG. 7A, wherein a port shutter is depicted transparently.

FIG. 17 depicts the assembly 10 with a transparent port shutter 48 in order to clearly display the torsion spring 22 and the inner structure of the shutter 48. The moving end of the torsion spring 22 is mounted within the port shutter 48 such that rotation of the shutter 48 about axis x1 towards the port 16 decreases the displacement angle 70 for so long as a force is applied. As the force is decreased, on either the perch 26 or a portion of the roof assembly 28, the shutter 48 rotates about axis x1 back towards the center of the housing 12, which correspondingly increases the displacement angle 70. Further referring to FIG. 17, the perch 26 is received in the receiving slot 64 of the port shutter 64. The receiving slot 64 includes a latch mechanism on the upper side of the shutter 48 that engages with the shaft of the perch 26.

In operation, this bird feeder 10 example functions as follows: The user releases the roof from the housing 12 by deflecting the latches 60 outwardly from over the latch studs 62, and slides the roof upwardly along a portion of the hanger 38 cable. This exposes the upwardly facing opening into the seed reservoir formed by the walls of the housing 12. Once the housing 12 is filled with birdseed to form a reservoir of the seed, the interior adjacent the feed ports 16 become filled with seed. The user latches the roof onto the latch studs 62. The seed filters down through the housing 12 and is distributed to in this case two seed ports 16. Birds having a normal weight can rest on the perch 26 and feed via the feed ports 16. The actuators 24 remain relatively unmoving, being held in an upward position by the bias of the one or more torsion springs 22. Should a non-bird species, such as a squirrel, try to feed from the seed ports 16, the spring bias of the torsion springs 22 is overcome, thus moving the perch 26 downwardly, which in turn drags the actuator 24 down as well as moves both of the port shutters 48 downwardly and forwardly to occlude the seed ports 16. Similarly, if a non-bird species such as a squirrel tries to access the seed ports 16 by gripping and hanging from the roof, the roof pivots about the latch studs, pressing on the adjacent actuator 24. The actuator 24 in turn moves the perch 26 immediately below that side of the housing 12, and the port shutter closes. Since both port shutters 48 are linked together with the cam surfaces 54 as previously discussed, the other port 16 is closed by the shutter as well, thus defeating any chance that a squirrel or other non-bird species could easily access the supply of seed in the housing 12.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular examples. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A bird feeder comprising:
   a housing having a generally vertically extending wall defining a reservoir, the housing including a first feed port and a second feed port formed through the wall and an upwardly facing opening to the reservoir;
   a roof assembly removably covering the upwardly facing opening and mounted for movement relative to the housing;
   a first perch adjacent to and mounted for movement relative to the first feed port;
   a second perch adjacent to and mounted for movement relative to a second feed port; and
   a mechanical link coupling the first perch and the second perch to the roof assembly, the mechanical link configured to move both the first perch relative to the first feed port and the second perch relative to the second feed port upon movement of the first perch relative to the housing.

2. The bird feeder of claim 1, wherein the first feed port and the second feed port become at least partially occluded upon the movement of the first perch relative to the housing.

3. The bird feeder of claim 1, wherein the mechanical link couples the first perch to the second perch.

4. The feeder of claim 1, wherein the mechanical link at least partially occludes the first and the second feed ports upon the movement of the first perch relative to the housing.

5. The feeder of claim 1, wherein the mechanical link moves downward relative to the housing to at least partially occlude the first feed port and the second feed port upon the movement of the first perch relative to the housing.

6. The feeder of claim 1, wherein the mechanical link extends generally vertically from each of the first perch and the second perch to a portion of the roof assembly.

7. The feeder of claim 6, wherein the portion of the roof assembly extends outwardly from the housing wall.

8. A bird feeder comprising:
   a housing having a generally vertically extending wall defining a reservoir, the housing including a first feed port and a second feed port formed through the wall and an upwardly facing opening to the reservoir;
   a roof assembly removably covering the upwardly facing opening and mounted for movement relative to the housing;
   a first perch adjacent to and mounted for movement relative to the first feed port;
   a second perch adjacent to and mounted for movement relative to a second feed port; and
   a mechanical link coupling the first perch and the second perch to the roof assembly, the mechanical link configured to move at least one of the first perch relative to the first feed port or the second perch relative to the second feed port upon movement of at least a portion of the roof assembly relative to the housing, the movement of the at least a portion of the roof assembly including a pivoting movement relative to the housing with the at least a portion of the roof assembly pivoting about a point within a boundary defined by the wall of the housing.

9. The bird feeder of claim 8, wherein the pivoting movement causes the mechanical link to translate relative to the housing.

10. The bird feeder of claim 8, wherein the at least a portion of the roof assembly includes a moveable portion, a translational movement of the moveable portion relative to the housing causing at least one of the first perch relative to the first feed port or the second perch relative to the second feed port.

11. The bird feeder of claim 10, wherein the translational movement is downward towards the first feed port and the second feed port.

12. The bird feeder of claim 8, wherein the first feed port and the second feed port become at least partially occluded upon the movement of at least a portion of the roof assembly relative to the housing.

13. The bird feeder of claim 8, wherein the mechanical link at least partially occludes the first and the second feed ports upon the movement of at least a portion of the roof assembly relative to the housing.

14. A bird feeder comprising:
a housing having a wall defining a reservoir and an opening to the reservoir, the wall having a feed port;
a perch disposed adjacent to the feed port;
a roof assembly having a lid portion configured to removably cover the opening and a moveable portion; and
an actuator extending from the perch to the moveable portion of the roof assembly along the wall, the actuator having an aperture and configured to move between a first position and a second position relative to the housing, the first position including an alignment of the aperture with the feed port, the second position including the actuator occluding the feed port.

15. The bird feeder of claim 14, further comprising:
a spring engaging the actuator and having a spring bias.

16. The bird feeder of claim 15, wherein the spring bias is configured to bias the actuator into the first position.

17. The bird feeder of claim 15, wherein the actuator is displaced into the second position where a weight on at least one of the perch or the moveable portion of the roof assembly overcomes the spring bias.

18. The bird feeder of claim 14, wherein the actuator slides along the wall between the first position and the second position.

19. The bird feeder of claim 14, further comprising:
a second perch disposed adjacent to a second feed port opposite the feed port; and
a second actuator extending from the second perch to the moveable portion of the roof assembly, the second actuator having a second aperture.

20. The bird feeder of claim 19, wherein movement of the second actuator is configured to mirror movement of the actuator, such that when the actuator is in the first position, the second aperture is aligned with the second feed port and when the actuator is in the second position, the second actuator occludes the second feed port.

21. The bird feeder of claim 14, wherein the moveable portion of the roof assembly extends outwardly from the wall.

22. A bird feeder comprising:
a housing having a wall defining a reservoir and an opening to the reservoir, the wall having a feed port;
a perch disposed adjacent to the feed port;
a roof assembly having a lid configured to removably cover the opening;
an actuator extending from the perch to the roof assembly; and
a port shutter connected to the actuator, the port shutter configured to move between a first position and a second position relative to the feed port, the first position including the port shutter spaced from the feed port providing access to the reservoir through the feed port, the second position including the port shutter occluding the feed port.

23. The bird feeder of claim 22, further comprising:
a spring engaging the port shutter and having a spring bias.

24. The bird feeder of claim 23, wherein the spring bias is configured to bias the port shutter into the first position.

25. The bird feeder of claim 23, wherein the port shutter is moved to the second position where a weight on at least one of the perch or the roof assembly overcomes the spring bias.

26. The bird feeder of claim 23, wherein the spring bias is adjustable.

27. The bird feeder of claim 22, wherein movement of the actuator relative to the wall causes the port shutter to move from the first portion to the second position.

28. The bird feeder of claim 22, wherein the port shutter is configured to pivot about an axis during movement from the first position to the second position.

29. The bird feeder of claim 22, further comprising:
a second perch disposed adjacent to a second feed port; and
a second port shutter engaging the port shutter, movement of the second port shutter configured to mirror movement of the port shutter such that when the port shutter is in the first position, the second port shutter is spaced from the second feed port and when the port shutter is in the second position, the second port shutter occludes the second feed port.

30. The bird feeder of claim 29, wherein the second port shutter and the port shutter engage using a pair of inter-engaging camming surfaces.

31. The bird feeder of claim 29, wherein a portion of the lid extends outwardly from the wall.

* * * * *